Nov. 13, 1923.
B. F. SEYMOUR
POWER TRANSMISSION DEVICE
Filed Jan. 3, 1919
1,474,095
2 Sheets-Sheet 2
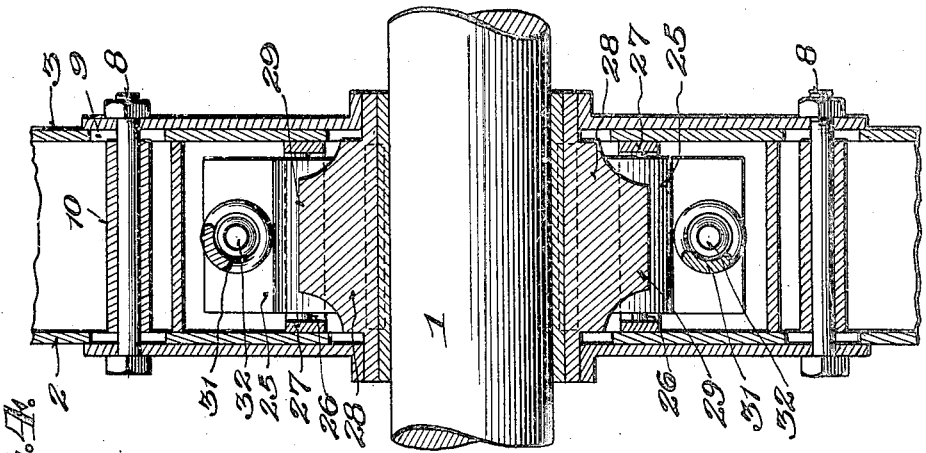
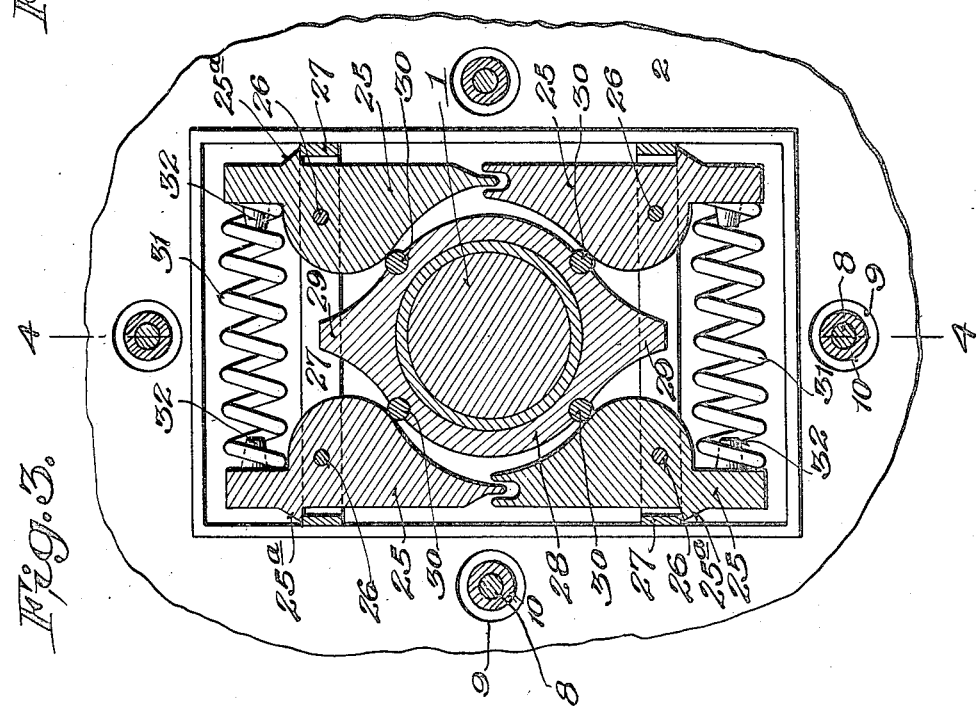
Inventor
B. F. Seymour,
By Meyers Cushman & Rea
Attorneys
WITNESS:—

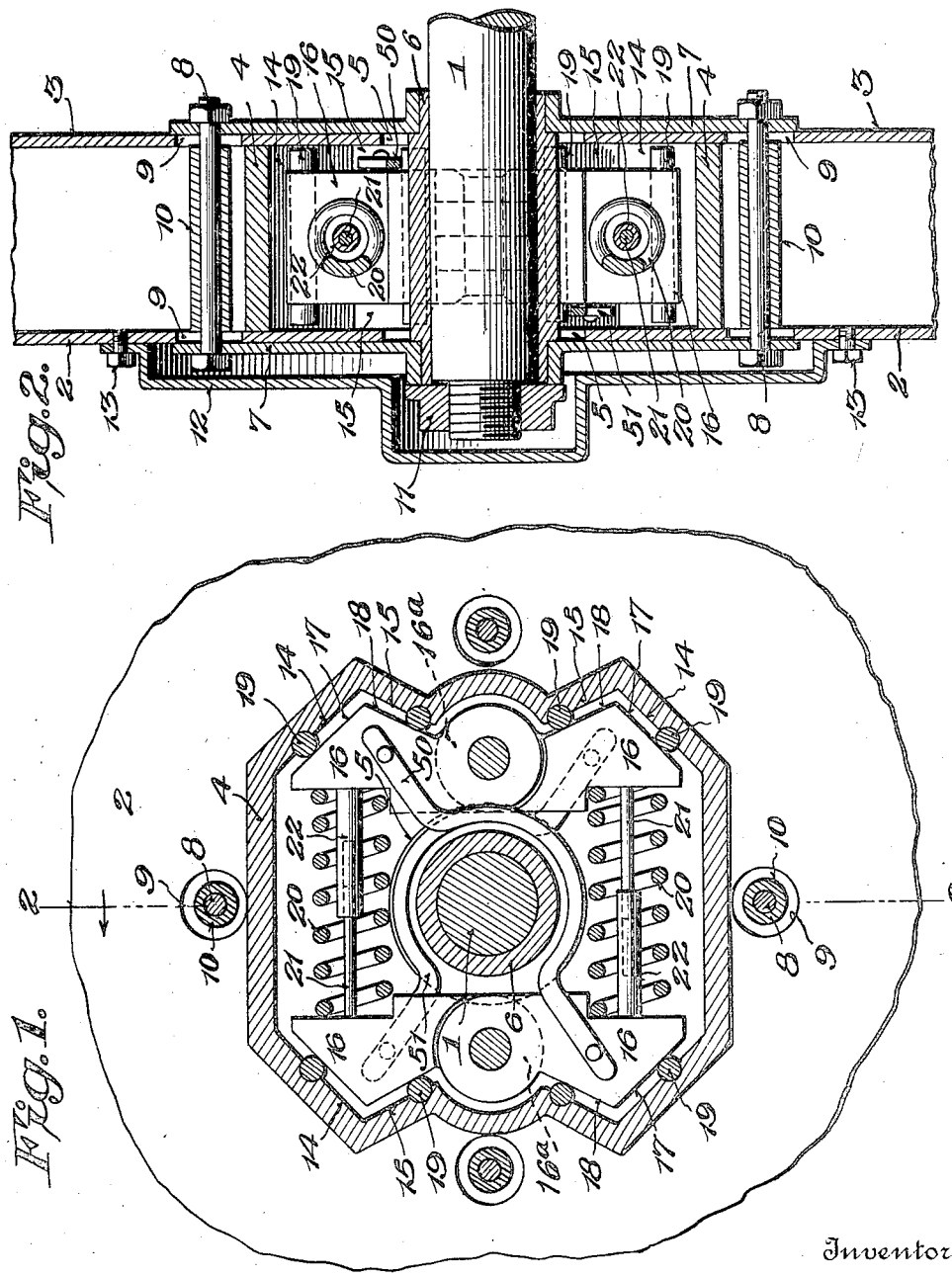

Patented Nov. 13, 1923.

1,474,095

UNITED STATES PATENT OFFICE.

BENJAMIN F. SEYMOUR, OF WASHINGTON, DISTRICT OF COLUMBIA.

POWER-TRANSMISSION DEVICE.

Application filed January 3, 1919. Serial No. 269,482.

*To all whom it may concern:*

Be it known that I, BENJAMIN F. SEYMOUR, a citizen of the United States, residing at Washington, in the District of Columbia, have invented new and useful Improvements in Power-Transmission Devices, of which the following is a specification.

The present invention relates to improvements in power transmission devices and has for its object to provide means for transmitting power from a shaft to a wheel or casing mounted thereon, and which will act to cushion and limit relative movement between said parts in a radial direction.

The invention is capable of being utilized in many different arts and under various conditions, but is particularly adapted and applicable for use in transmitting power from a driving shaft or axle to a wheel, for example the ground wheel of a vehicle.

In the accompanying drawings:

Figure 1 is a sectional view through a shaft and portion of a wheel or casing including one embodiment of the invention.

Figure 2 is a sectional view substantially on the line 2—2 of Figure 1.

Figure 3 is a transverse section illustrating another embodiment of the invention.

Figure 4 is a sectional view on the line 4—4 of Figure 3.

Referring to the drawings, and particularly to Figures 1 and 2, 1 designates a power or driving shaft about which is fitted a wheel or casing, shown as comprising side plates 2, 3, which are connected by a frame 4. As shown in Figure 2 the side plates 2, 3, of the casing are provided with a central aperture 5 of greater diameter than the shaft 1 or the hub sleeve 6 suitably fixed to rotate with the axle so that the casing is adapted to have a limited movement relative to the shaft in a radial direction. Side plates or disks 7 supported on the hub member 6 extend across the openings 5 and said disks are connected by tie bolts 8 which extend through circular openings 9 formed in the plates 2, 3, and through spacer sleeves 10 located between said side plates 2 and 3, as shown. A nut 11 is shown as applied to one end of the shaft 1 to retain the hub sleeve 6 and parts supported thereby against longitudinal movement in one direction on the shaft and a cover plate 12 is secured to the side 2 of the casing by screws 13.

The inner face of the frame 4 which connects the side members 2, 3, is provided with a plurality of relatively angular or cam surfaces 14, 15, arranged in pairs about the axle the members of each pair forming a V-shaped surface. With said cam surfaces 14, 15, are adapted to cooperate a series of cam members 16 supported on a pair of ears 16ª that project from the hub sleeve 6 and as shown are arranged at diametrically opposite points with regard to the shaft 1.

Each cam member 16 is provided with cam surfaces 17, 18, respectively positioned opposite and adapted to cooperate with the cam surfaces 14, 15, of the wheel casing, anti-friction rollers 19 being provided in seats formed in the angular faces 14, 15 and co-acting with the cam surfaces 17, 18.

In the embodiment of the invention illustrated, two pairs of cam members 16 are provided, the members of each pair being arranged at opposite sides of the shaft 1 and a coiled spring 20 is positioned between opposite pairs of said cam members, being arranged about a telescopic central guide, the members 21, 22 of which are respectively secured to the opposite cam members 16. The pivotal connections of the cam members 16 with the ears on the hub sleeve are in the plane of the axis of the shaft 1 and it will be seen that rotary movement of said shaft will be transmitted through said cam members 16 and the rollers 19 to the cam faces 14, 15 on the wheel casing, so that the latter will turn with the shaft. The springs 20 act to maintain contact between the members 16 and rollers 19. If for any cause a relative movement between the shaft and wheel casing in a radial direction occurs, the rollers 19 will act to turn the cam members 16 about their pivotal connection with the hub sleeve which turning movement will be resisted by the springs 20. That is if the shaft 1 tends to move downward from the position shown in Figures 1 and 2, relative to the wheel casing, which movement is permitted by the dimensions of the openings 5, the free ends of the cam members 16 will be forced inwardly compressing the spring 20 which will thus act as a shock absorber and effectively cushion the relative movement between the axle and the wheel casing.

In the embodiment of the invention illustrated in Figures 3 and 4, the pivotally mounted cam members 25 are shown as fulcrumed at 26 in a frame 27 which is arranged between and connected to the side members 2, 3, of the wheel casing, and the sleeve or hub member 28 is provided with cam elements 29 cooperable with the several cam elements 25. Said hub member 28 is provided with a plurality of anti-friction rollers 30 engaging the several cam elements 25. It will therefore be seen that all vibration of the hub member 28 will be dissipated through said cam elements 25 by their respective rocking movements against the spring members 31.

The coil springs 31 positioned between the members of each pair of pivotally supported cams, and held from lateral movement relative thereto by projecting studs 32, act to hold the members 25 in contact with the side members of the frame 27. As shown, each of said pivoted cam members is provided with a slight projection 25ª that extends over and normally rests on the adjacent surface of a member of the frame 27.

The ends of the pivotally mounted cams 25 opposite those between which the springs 31 are arranged are shaped to engage with the corresponding ends of the cam members on the opposite side of the shaft 1 so that turning movement imparted to one of said cams will cause a similar movement of the other cam member engaged therewith.

It will be seen that the operation of this embodiment of the invention is similar to that illustrated in Figures 1 and 2. That is, rotary movement of the shaft will be transmitted to the surrounding casing or wheel through the coaction of the cam members and the interposed rollers, and any relative movement in a radial direction between the shaft and casing will produce a turning movement of the pivoted cam members and consequent compression of the springs 31, which thus act as cushion devices or shock absorbers.

As previously stated the invention is particularly applicable to the connection of the wheels of a vehicle with the driving axle although it may, as is evident be employed in connection with any shaft and surrounding body where there is a likelihood of there being relative movement between such parts in a direction radial of the shaft.

As shown in Figures 1 and 2 the diagonally oppositely arranged cam members may be connected by links 50, 51, each having an intermediate curved portion extending about the sleeve 6.

Having thus described the invention, what is claimed is:

1. The combination of a shaft, a casing surrounding the shaft, means for transmitting power from one of said elements to the other including two sets of members mounted, respectively, on the shaft and casing and having opposed cam faces, one of said sets of members being pivotally supported, springs acting to force said pivoted members toward the other cam members, and rollers mounted in seats in the cam faces of one of said sets of members and contacting with the opposed faces of the other members.

2. The combination of a shaft, a casing surrounding the shaft, a plurality of pairs of cams positioned between the shaft and casing and pivotally supported on one of said elements, the members of each pair being in planes on opposite sides of the shaft, cam surfaces rigid with the other said element and adapted to cooperate with the pivoted cams to transmit rotary movement from one element to the other, and springs acting to maintain contact between the pivoted cams and rigid cam surfaces and to resist turning movement of the pivoted cams due to relative movement between the shaft and casing in a radial direction.

3. The combination of a shaft, a casing surrounding the shaft, a plurality of pairs of cams pivotally supported on one of said elements, cam surfaces rigid with the other said element and arranged in opposition to the pivoted cams to transmit rotary movement from one element to the other, and coiled springs interposed between the members of each pair of pivoted cams and acting to force said cams toward the opposed cam surfaces and to resist turning movement of the pivoted cams due to relative movement between the shaft and casing in a radial direction.

4. The combination of a shaft, a plurality of pairs of pivotally mounted cam members carried by the shaft, a casing surrounding said members and the shaft and having cam surfaces arranged opposite the cam surfaces of said shaft members, rollers arranged in seats in the cam surfaces of the casing and bearing against the cam surfaces of the shaft members, and a spring acting to separate the members of each pair of said shaft members and maintain contact between said members and rollers.

5. The combination of a shaft, a hub arranged to turn with the shaft and provided with diametrically oppositely projecting ears, two cam members pivotally connected to and extending in opposite directions from each of said ears, a casing surrounding the shaft and said cam members and having cam surfaces opposite the cam surface of each of said members, rollers arranged between the cam members and corresponding cam surfaces on the casing, and springs extending transversely of the shaft between the cam members that project in the same direction therefrom and acting to maintain contact between said members and rollers.

In testimony whereof I have hereunto set my hand.

BENJAMIN F. SEYMOUR.